March 27, 1962 H. P. HENDERSON 3,026,576
METHOD OF MANUFACTURING DOOR KNOBS
Filed May 11, 1959
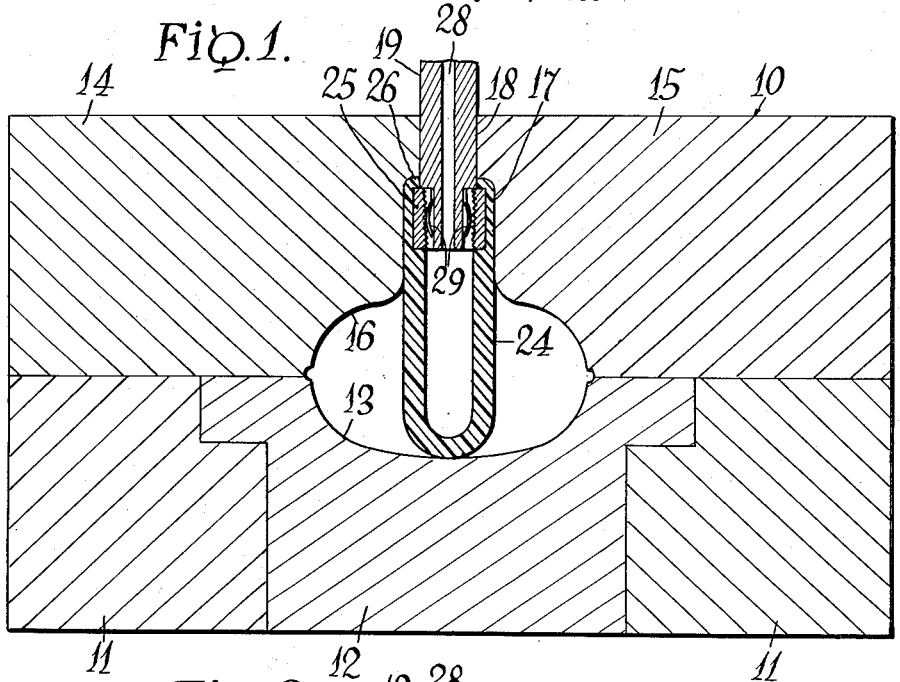
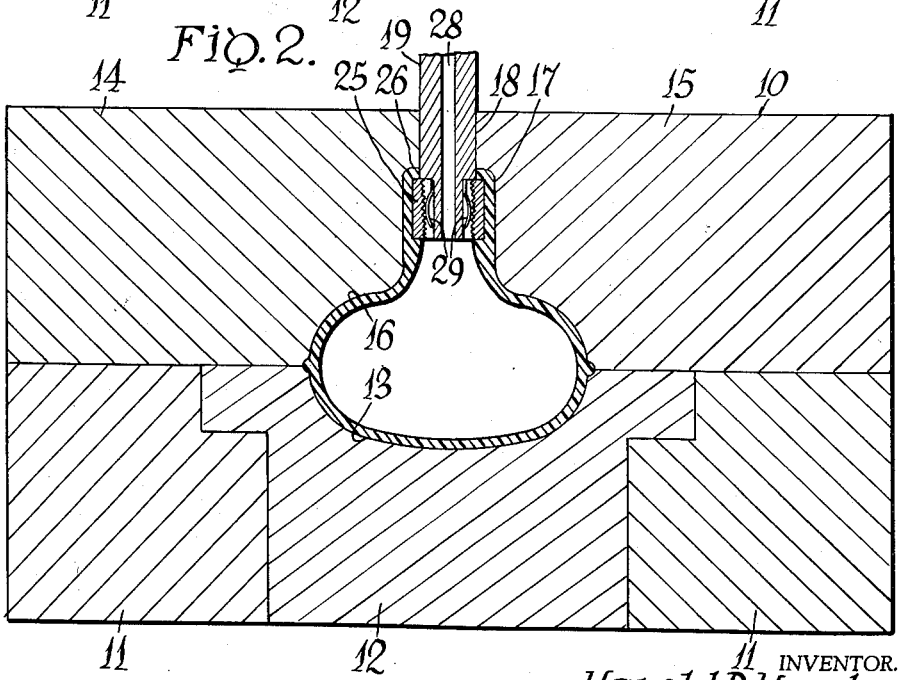
INVENTOR.
*Harold P. Henderson,*
BY
*Bean, Brooks, Buckley & Bean.*
ATTORNEYS.

United States Patent Office 3,026,576
Patented Mar. 27, 1962

3,026,576
METHOD OF MANUFACTURING DOOR KNOBS
Harold P. Henderson, 271 Northwood Drive,
Tonawanda, N.Y.
Filed May 11, 1959, Ser. No. 812,190
4 Claims. (Cl. 18—59)

This invention relates to a novel method of producing door knobs.

Door knobs are most commonly fabricated entirely from metal or are of two-piece construction wherein the shank portion is of metal and the knob portion is of glass, porcelain, or other decorative material. It has heretofore been proposed to make door knobs of plastic molded material but such proposals have generally comprised two part constructions wherein the several plastic parts are cemented or otherwise joined. Furthermore, the proposals of the prior art have not made adequate or practical provision for associating the door knobs with the usual projecting shank members of conventional door latch mechanisms.

In fact molded knobs of the prior art are generally or most commonly of the type wherein the knob is molded directly upon the end of a shank, such as in gear shift levers of automobiles, and the like, wherein the knobs are relatively small. Such constructions are not usable in door knob manufacture because of the necessity of removably attaching the same to a door latch shank. Furthermore, knobs of the smaller type which are molded directly to a shank member are of solid construction which would not be satisfactory in door knob construction for reasons of economy, among others.

The present invention provides a hollow, one-piece door knob construction wherein the knob element is of molded plastic material and wherein the material is distributed in the knob in a manner which affords maximum strength and rigidity with optimum economy of material. Furthermore, means are provided for conveniently and efficiently associating the knob with a door latch shank in a manner which is consistent with conventional practices and procedures.

Door knobs constructed according to the present invention may be made in a wide variety of colors which are readily available in molded plastic materials and may also be made with a wide variety of surface ornamentation. In fact the final mold employed in the preferred process of the invention is constructed so that a separate insert which molds the outer surface of the door knob may readily be interchanged for molding knobs having a wide variety of surface effects including monograms and other special forms of ornamentation.

Speaking generally, the novel method of manufacturing door knobs in accordance with the present invention comprises molding an open ended tubular member by conventional injection molding means and then blowing the closed-end portion thereof into a finish mold which produces a knob portion of lesser wall thickness than the outer un-blown open-end portion of the tubular member, which outer open-end portion forms the bearing portion of the knob which connects with the latch shank member. For the purpose of effecting this connection a connection bushing is molded into the outer un-blown portion of the knob, either during the injection molding of the tubular blank of preform or in the operation wherein the tubular blank is blown into final conformity with a finish mold or between these operations.

Various modifications may be made, both in the article of the present invention and in the method and means employed in producing the same. However, in order to disclose a practical embodiment of the principles of the present invention, the accompanying drawing illustrates one form of a final doorknob constructed in accordance with the principles of the present invention and one form of a blow mold in which the same may be brought to final conformation. It is to be understood, however, that the forms thus illustrated and described in the following specification are by way of example only and that the principles of the present invention are not limited precisely thereto or otherwise than as defined in the appended claims.

In the drawing:

FIG. 1 is a cross sectional view through one form of a final or blow mold with one form of a blank or preform of plastic material disposed therein ready for final forming; and FIG. 2 is a cross sectional view similar to FIG. 1 but with the tubular blank member blown into conformation with the cavity of the final or blow mold.

In the drawing like characters of reference denote like parts and the numeral 10 designates generally a final or blow mold apparatus which comprises a relatively stationary fixed bed portion or portions designed 11, which portions are provided with a central insert 12 which contains a cavity 13 for forming the outer half or face portion of a door knob. Mounted upon the bed portions 11 and insert 12 are a pair of mold blocks 14 and 15 which are movable toward and away from each other in a lateral direction by sliding movement on the bed portions 11, in a manner which is fairly common in the plastic molding art, for opening the mold cavity.

The mold blocks 14 and 15 jointly form a cavity portion 16 which comprises the rear portion of a door knob, that is, the remainder of the door knob formation in addition to the outer or face portion which is formed by the cavity portion 13 which is contained in the mold insert 12. The cavity 16 has an upward axially extending portion 17 of reduced diameter which forms the bearing portion of the plastic door knob and a further axially extending reduced portion 18 which receives a combined blank holder and blow tube 19.

Prior to the final blowing operation illustrated in FIGS. 1 and 2, a blank or preform is molded by conventionl injection molding means and procedures which need not be illustrated herein. The blank or preform thus provided is shown at 24 in FIG. 1 and comprises a closed ended tubular member of plastic material which, by way of example, may be of a polypropylene plastic. In the form illustrated herein this blank has a relatively thick wall to provide a bearing portion of adequate strength and to provide sufficient plastic material in the remainder of the blank for blowing the bulbous portion of the door knob, as will presently appear.

In the instance set forth herein by way of example, an internally threaded metal bushing 25 is molded in place near the outer end of the tubular preform 24 at the time that the latter is injection molded. It will be noted that the outer end portion of the tubular preform 24 extends over the outer end of bushing 25 in the form of a lip 26 whereby the threaded insert is securely embedded in the interior of the preform 24. Bushing 25 may have suitably non-circular peripheral portions or similar formations to prevent rotation thereof in the molded knob.

In the alternative, bushing 25 or a similar member may be inserted in the tubular blank 24 after the latter has been injection molded, in which case the lip 26 will not be present and the bushing will be pressed into the outer end of tubular member 24 subsequent to injection molding of the latter. In this alternative form the bushing may have an enlarged end flange portion seating against the end of the tubular blank.

In general it will be necessary to re-heat the tubular blank 24 just prior to introducing the same to the blow mold apparatus illustrated in FIGS. 1 and 2 to render the plastic material readily moldable by blowing air into the interior thereof. This re-heating may be accomplished in various ways prior to introducing the blank 24 to the blow mold 10.

As shown in FIGS. 1 and 2, the combined holder and blow tube 19 has an axial air passage 28 and is provided with bow spring members 29 at its outer end which are inserted into bushing 24 to retain the tubular member 24 on holder 19. In the present instance, the body portion of holder and blow tube 19 fits closely within the lip formation 26 of tubular member 24 to provide against leakage of air in the blowing operation.

It is to be understood that the tubular member 24, thus suspended on holder 19, is brought to the position illustrated in FIG. 1 with the mold parts 14 and 15 separated laterally. The mold parts 14 and 15 are then closed to move them to the position of FIG. 1. In the form of holder and mold apparatus illustrated in FIGS. 1 and 2 the air seal between blow tube 19 and lip 26 is merely incidental or alternative, since the closure of the mold parts 14 and 15 around blow tube 19 provides an adequately sealed fluid system.

After the mold parts are closed on the tubular blank 24, as illustrated in FIG. 1, blowing air is introduced through the combined holder and blow tube 19 and the lower closed end portion of the tubular blank 24 is blown into conformity with the cavity portions 13 and 16 of the blow mold apparatus to form the door knob illustrated clearly in FIG. 2.

The blowing of the tubular member in this manner attenuates the wall thickness thereof in the bulbous portion of the knob and this is consistent with general strength requirements which dictate that the unblown shank portion of the knob which contains the bushing 25 be substantially heavier than the outer bulbous portion of the knob.

I claim:

1. A method of manufacturing door knobs which comprises forming by injection molding a unitary closed ended tubular blank of organic thermoplastic material wherein the diameter and wall thickness of the blank is proportioned to form the bearing portion for the knob, embedding a metal mounting bushing in the interior of the open end of the tubular blank to positively retain said bushing against axial displacement, and subsequently blowing the closed end portion of the tubular blank to enlarge the same and form a bulbous relatively thinner walled handle portion for the door knob.

2. A method of manufacturing door knobs which comprises forming by injection molding a unitary closed ended tubular blank of organic thermoplastic material wherein the diameter and wall thickness of the blank is proportioned to form the bearing portion for the knob, embedding a metal mounting bushing in the interior of the open end of the tubular blank to positively retain said bushing against axial displacement, disposing the blank in a mold cavity, and blowing the closed end portion of the tubular blank into conformity with said cavity to form a bulbous relatively thinner walled handle portion for the door knob.

3. A method of manufacturing door knobs which comprises forming by injection molding a unitary closed ended tubular blank of organic thermoplastic material wherein the diameter and wall thickness of the blank is proportioned to form the bearing portion for the knob, embedding a metal mounting bushing in the interior of the open end of the tubular blank to positively retain said bushing against axial displacement, suspending the tubular blank on a hollow cylindrical bar by inserting the latter removably in said bushing, and then blowing the closed end portion of the tubular blank to enlarge the same and form a bulbous relatively thinner walled handle portion for the door knob by blowing air thereinto through said hollow bar.

4. A method of manufacturing door knobs which comprises forming by injection molding a unitary closed ended tubular blank of organic thermoplastic material wherein the diameter and wall thickness of the blank is proportioned to form the bearing portion for the knob, embedding a metal mounting bushing in the interior of the open end of the tubular blank to positively retain said bushing against axial displacement, suspending the tubular blank on a hollow cylindrical bar by inserting the latter removably in said bushing, disposing the suspended tubular blank in a mold cavity, and then blowing the closed end portion of the tubular blank into conformity with said mold cavity to form a bulbous relatively thinner walled handle portion for the door knob by blowing air thereinto through said hollow bar.

References Cited in the file of this patent

UNITED STATES PATENTS

| 231,903 | Dougherty | Sept. 7, 1880 |
| 1,052,081 | Miltner | Feb. 4, 1913 |
| 2,105,704 | Shippy et al. | Jan. 18, 1938 |
| 2,348,738 | Hofman | May 16, 1944 |
| 2,916,774 | Wetty et al. | Dec. 15, 1959 |
| 2,930,079 | Parfrey | Mar. 29, 1960 |